US011551717B2

(12) United States Patent
Kim et al.

(10) Patent No.: US 11,551,717 B2
(45) Date of Patent: Jan. 10, 2023

(54) SOUND SOURCE FILE STRUCTURE, RECORDING MEDIUM RECORDING THE SAME, AND METHOD OF PRODUCING SOUND SOURCE FILE

(71) Applicant: KEUMYOUNG ENTERTAINMENT CO., LTD, Seoul (KR)

(72) Inventors: Jin-Gab Kim, Seoul (KR); Myeong-Hwan Kim, Seoul (KR)

(73) Assignee: KEUMYOUNG ENTERTAINMENT CO., LTD, Seoul (KR)

( * ) Notice: Subject to any disclaimer, the term of this patent is extended or adjusted under 35 U.S.C. 154(b) by 0 days.

(21) Appl. No.: 17/171,683

(22) Filed: Feb. 9, 2021

(65) Prior Publication Data

US 2021/0358522 A1 Nov. 18, 2021

(30) Foreign Application Priority Data

May 15, 2020 (KR) ........................ 10-2020-0058375

(51) Int. Cl.
*G11B 20/10* (2006.01)

(52) U.S. Cl.
CPC ............... *G11B 20/10527* (2013.01); *G11B 2020/10546* (2013.01)

(58) Field of Classification Search
None
See application file for complete search history.

(56) References Cited

U.S. PATENT DOCUMENTS

| 5,621,182 A * | 4/1997 | Matsumoto | G10H 1/366 434/307 A |
| 2005/0265172 A1* | 12/2005 | Stankiewicz | G11B 27/10 369/47.16 |
| 2019/0088301 A1* | 3/2019 | Maekawa | G11C 13/0033 |

FOREIGN PATENT DOCUMENTS

| CA | 3108789 A1 | 4/2021 |
| JP | 2004-341338 A | 12/2004 |
| JP | 2005-037846 A | 2/2005 |
| JP | 2005-37848 A | 2/2005 |
| JP | 2005037846 A * | 2/2005 |
| JP | 2015-007776 A | 1/2015 |
| KR | 10-0160642 B1 | 1/1999 |

(Continued)

OTHER PUBLICATIONS

Office Action issued for corresponding Korean Patent Application No. 10-2020-0058375 dated Jul. 31, 2020, along with an English translation.

(Continued)

*Primary Examiner* — Walter F Briney, III
(74) *Attorney, Agent, or Firm* — Hauptman Ham, LLP

(57) ABSTRACT

The present disclosure relates to a sound source file structure, to output lyrics as audible sounds right before melodies corresponding to the lyrics start, to help a user to remind the lyrics based on accompaniment for a song after the accompaniment starts to be provided, and to help the user to sing based on correct lyrics corresponding to the melodies. The sound source file structure may include one or more backing sound source layers in which backing sounds based on beats and rhythms are placed, a melody sound source layer in which melody notes corresponding to lyrics based on beats and rhythms and a rest section corresponding to a rest are placed, and a lyric voice source layer in which a lyric voice is placed at a position corresponding to a rest section.

12 Claims, 12 Drawing Sheets

(56) References Cited

FOREIGN PATENT DOCUMENTS

| | | |
|---|---|---|
| KR | 10-0639154 B1 | 10/2006 |
| KR | 10-0717647 B1 | 5/2007 |
| KR | 10-1029483 B1 | 4/2011 |
| KR | 10-2013-0049332 A | 5/2013 |
| KR | 10-2013-0094564 A | 8/2013 |
| KR | 10-2050785 B1 | 12/2019 |
| KR | 10-2200792 B1 | 1/2021 |
| WO | 2016/157377 A1 | 10/2016 |

OTHER PUBLICATIONS

Notice of Allowance issued for corresponding Korean Patent Application No. 10-2020-0058375 dated Dec. 28, 2020, along with an English translation.

The extended European Search Report dated Jul. 19, 2021 in connection with the counterpart European Patent Application No. 21155740.0, citing the above reference(s).

* cited by examiner

| Symbol | Rest | Beat | Rhythm | Time length |
|---|---|---|---|---|
| ▬ | Whole rest | Four beats | \/\/\/\/ | 4 seconds |
| ▬. | Dotted half rest | Three beats | \/\/\/ | 3 seconds |
| ▬ | Half rest | Two beats | \/\/ | 2 seconds |
| 𝄽. | Dotted quarter rest | 1 and 1/2 beats | \/ | 1.5 seconds |
| 𝄽 | Quarter rest | 1 beat | V | 1 second |
| 𝄾. | Dotted eighth rest | 3/4 beat | \ | 0.75 second |
| 𝄾 | Eighth rest | 1/2 beat | \ | 0.5 second |
| 𝄿 | Sixteenth rest | 1/4 beat | \ | 0.25 second |

SOUND SOURCE FILE STRUCTURE, RECORDING MEDIUM RECORDING THE SAME, AND METHOD OF PRODUCING SOUND SOURCE FILE

CROSS-REFERENCE TO RELATED APPLICATION

This application claims priority under 35 U.S.C. § 119 to Korean Patent Application No. 10-2020-0058375, filed on May 15, 2020, in the Korean Intellectual Property Office (KIPO), the disclosure of which is incorporated by reference herein in its entirety.

FIELD

Disclosed herein are a sound source file structure, a recording medium recording the same, and a method of producing a sound source file, and more particularly, a sound source file structure, a recording medium recording the same, and a method of producing a sound source file that enable a sound source output device, outputting lyrics together with melodies, to output lyrics as audible sounds right before melodies corresponding to the lyrics start, to help a user to remind the lyrics based on accompaniment for a song after the accompaniment starts to be provided, and to help the user to sing based on correct lyrics corresponding to the melodies.

BACKGROUND

A song accompaniment device displays lyrics of a song being played on a display, combines a vocal sound input through a microphone with accompaniment for the song and outputs the combination of the vocal sound and the accompaniment through a speaker. A user selects a desired song through the song accompaniment device, and sings the song based on accompaniment for the song.

The user sings the song based on melodies while seeing lyrics of the song on the display. In this case, the user can sing the song using the song accompaniment device with no need to remember the lyrics. The song accompaniment device can be used in various environments. For example, a set-top box used in homes performs a song accompaniment function. Accordingly, lyrics are displayed on the TV connected with the set-top box, and accompaniment (melody) audio signals are output through a provided speaker. The song accompaniment device, as described above, displays lyrics on the display and helps the user to sing using the lyrics synchronized with the accompaniment.

FIG. 1 is a block diagram showing an entire configuration of a song accompaniment system of the related art.

Referring to FIG. 1, the song accompaniment system of the related art includes one or more song accompaniment devices 10 and further includes a server 20 connected to a broadband network.

The song accompaniment device 10 receives an audio file of a selected song from the server 20, plays the received audio file, outputs audio signals including melodies through a speaker within a period where a series of parts to be played are played. The song accompaniment device 10 outputs audio signals including a lyric voice corresponding to lyrics of following parts to be played through the speaker during a rest period without melodies in the period where a series of parts to be played are currently being played. That is, the song accompaniment device 10 outputs following lyrics as audio signals at a time when the following lyrics do not overlap melodies, helps the user to easily recognizes the lyrics without memory of the lyrics, and to easily sing a song without disturbing the melody (the melody playing).

The server 20 is provided with (stores) a plurality of audio files, receives a request for transmission of a selected song from the song accompaniment device 10, and transmits an audio file corresponding to the song (e.g., a song corresponding to a song number) subject to the received request for transmission to the song accompaniment device 10 that makes the request for transmission.

In a situation where the song accompaniment system is not provided with a display or a display cannot be used, the user may be unable to sing a song in response to melodies or may sing a song based on incorrect lyrics because the user does not know or remember the lyrics.

For example, when a user sings based on accompaniment for a song under the circumstances where the user cannot see lyrics on the display, e.g., while the user is driving a vehicle, the user may not remember the lyrics.

Further, although a song accompaniment device 10 is installed in a vehicle, there are times when the song accompaniment device 10 cannot access a server 20 while the vehicle is moving. In this case, the song accompaniment device 10 cannot receive an audio file from the server 20 and the song accompaniment device 10 cannot be used.

Against this backdrop, there is a growing need for a technology enabling a song accompaniment device 10 to be used even when a display cannot be used or is not provided, enabling the song accompaniment device 10 to be used without a connection to a server 20, and enabling a user to recognize lyrics of a song easily and intuitively.

SUMMARY

Embodiments of the present invention are directed to a sound source file structure, a recording medium recording the same, and a method of producing a sound source file, and more particularly, a sound source file structure, a recording medium recording the same, and a method of producing a sound source file that enable a sound source output device, outputting lyrics together with melodies, to output lyrics as audible sounds right before melodies corresponding to the lyrics start, to help a user to remind the lyrics based on accompaniment for a song after the accompaniment starts to be provided, and to help the user to sing based on correct lyrics corresponding to the melodies.

Aspects are not limited to the above ones, and other aspects and advantages that are not mentioned above can be clearly understood from the following description and can be more clearly understood from the embodiments set forth herein. Additionally, the aspects and advantages of the present disclosure can be realized via means and combinations thereof that are described in the appended claims.

According to an embodiment of the present invention, a sound source file structure includes: one or more backing sound source layers in which backing sounds based on beats and rhythms are placed; a melody sound source layer in which melody notes corresponding to lyrics based on the beats and rhythms, and a rest section corresponding to a rest are placed; and a lyric voice source layer in which a lyric voice is placed in a position corresponding to the rest section. The lyric voice may have no beat and rhythm or no beat and rhythm and no pitch interval is recorded and placed in the lyric voice source layer by a user or a performer through a recording device. The backing sounds and the melody notes are recorded at the same time, and then the lyric voices are recorded and placed while the recorded backing sounds and the melody notes are played.

The rest section may have one or more of durations corresponding to a whole rest, a dotted half rest, a half rest, a dotted quarter rest, a quarter rest, a dotted eighth rest, an eighth rest, and a sixteenth rest.

One or more of the rest sections may be placed before and after the melody notes or between the melody notes.

The lyric voice may be placed in a position that corresponds to a rest section before the melody notes start to play, among positions corresponding to one or more of the rest sections.

The lyric voice may be placed at a position corresponding to a rest section that is 0.5 second before the melody notes start to play, among positions corresponding to one or more of the rest sections.

The lyric voice may have no beat and rhythm and no pitch interval.

The lyric voice may express lyrics having no beat and rhythm.

A voice (a vocal sound) may be a voice (a vocal sound) of a performer who actually sings based on the lyrics.

The backing sound source layer may include: a first backing sound source layer in which bass sounds based on beats and rhythms are placed; a second backing sound source layer in which string ensemble sounds based on beats and rhythms are placed; and a third backing sound source layer in which brass sounds based on beats and rhythms are placed.

The backing sound source layer may include: a first backing sound source layer in which guitar sounds based on beats and rhythms are placed; a second backing sound source layer in which drum sounds based on beats and rhythms are placed; and a third backing sound source layer in which bass sounds based on beats and rhythms are placed.

In the melody sound source layer, piano sounds or violin sounds corresponding to lyrics based on beats and rhythms may be placed.

According to another embodiment of the present invention, a recording medium, on which a sound source file structure according to an embodiment is recorded, may include: one or more backing sound source layers in which backing sounds based on beats and rhythms are recorded; a melody sound source layer in which a rest section corresponding to a rest is included, and melody notes corresponding to lyrics based on beats and rhythms are recorded; and a lyric voice source layer in which a lyric voices are recorded in a position corresponding to the rest section. The lyric voice may have no beat and rhythm or the lyric voice having no beat and rhythm and no pitch interval is recorded in the lyric voice source layer by a user or a performer through a recording device. The backing sounds, the melody notes and the lyric voices are recorded at the same time instead of being recorded sequentially.

The recording medium may further include a plurality of active regions defined on a substrate by an isolation film, the plurality of active regions are extended in one direction so that a first region and a second region are provided at both ends of each of the plurality of active regions, arranged so that the one direction forms an oblique angle with respect to a first direction, and arranged in parallel in a second direction intersecting the first direction; a plurality of word lines arranged in parallel in the first direction while extending in the second direction on the substrate across corresponding ones of the plurality of active regions arranged in the second direction; a plurality of source lines arranged in parallel in the second direction while extending in the first direction and commonly and electrically connected to the first regions of corresponding ones of the plurality of active regions arranged in the first direction; a plurality of variable resistance structures arranged in the first direction and the second direction to correspond to the plurality of active regions, and electrically connected to the second regions of corresponding ones of the plurality of active regions; and a plurality of bit lines arranged in parallel in the second direction while extending in the first direction to alternate with the plurality of source lines and commonly and electrically connected to corresponding ones of the plurality of variable resistance structures arranged in the first direction.

The backing sounds, the melody notes and the lyric voices may be respectively converted into 0 or 1, a specific memory cell Cs may be determined as a result of selection of a specific word line WL5 and a specific bit line BL1, a current path to the specific source line SL2 and an access transistor T of the specific memory cell Cs and the specific bit line BL1 may be created as a result of supply of a high voltage to a specific source line SL2, a low voltage to the specific bit line BL1 and a turn-on voltage to the specific word line WL5, and thus, data "0" may be recorded on a magnetic transfer junction (MTJ) element of the specific memory cell Cs.

Additionally, a specific memory cell Cs may be selected as a result of selection of a specific word line WL5 and a specific bit line BL1, a current path to the specific bit line BL1 and an access transistor T of the specific memory cell Cs and a specific source line SL2 may be created as a result of supply of a low voltage to the specific source line SL2, a high voltage to the specific bit line BL1 and a turn-on voltage to the specific word line WL5, and thus, data "1" may be recorded on an MTJ element of the specific memory cell Cs. One or more of the rest sections may be recorded before and after the melody notes or between the melody notes. The lyric voice may be recorded in a position that corresponds to a rest section before the melody notes start to play, among positions corresponding to one or more of the rest sections. The lyric voice may be recorded at a position corresponding to a rest section that is 0.5 second before the melody notes start to play, among positions corresponding to one or more of the rest sections.

According to another embodiment of the present invention, a method of producing a sound source file according to an embodiment may include: (a) recording backing sounds based on beats and rhythms in a backing sound source layer; (b) recording melody notes corresponding to lyrics based on the beats and rhythms in a melody sound source layer including a rest section corresponding to a rest; and (c) recording lyric voices in a position corresponding to the rest section in a lyric voice source layer. The lyric voice may have no beat and rhythm or the lyric voice having no beat and rhythm and no pitch interval is recorded in the lyric voice source layer by a user or a performer through a recording device. The backing sounds and melody notes are recorded at the same time, and then the lyric voices are recorded while the recorded backing sounds and melody notes are played.

The rest section may have durations corresponding to a whole rest, a dotted half rest, a half rest, a dotted quarter rest, a quarter rest, a dotted eighth rest, an eighth rest, and a sixteenth rest.

One or more of the rest sections may be placed before and after the melody notes or between the melody notes.

The lyric voice may be recorded in a position that corresponds to a rest section before the melody notes start to play, among positions corresponding to one or more of the rest sections.

The lyric voice may be recorded at a position corresponding to a rest section that is 0.5 second before the melody notes start to play, among positions corresponding to one or more of the rest sections.

The lyric voice may have no beat and rhythm and no pitch interval.

The lyric voice may express lyrics having no beat and rhythm.

The step (a) may include recording bass sounds based on beats and rhythms in a first backing sound source layer, or recording string ensemble sounds based on beats and rhythms in a second backing sound source layer, or recording brass sounds based on beats and rhythms in a third backing sound source layer.

The step (a) may include recording guitar sounds based on beats and rhythms in a first backing sound source layer, or recording drum sounds based on beats and rhythms in a second backing sound source layer, or recording bass sounds based on beats and rhythms in a third backing sound source layer.

The step (b) may include recording piano sounds corresponding to lyrics based on beats and rhythms in the melody sound source layer.

The step (b) may include recording violin sounds corresponding to lyrics based on beats and rhythms in the melody sound source layer.

According to the present invention, lyrics of a song that is being played may be readily recognized based on a lyric voice, under the circumstances in which a display cannot be used.

According to the present invention, following lyrics may be output as a lyric voice during a rest section of accompaniment melodies that is currently being played, to allow a user to intuitively recognize the following lyrics.

According to the present invention, a length of following lyrics to be output as a lyric voice may be adjusted and recorded depending on a length of a rest section of accompaniment melodies that is currently being played.

Specific effects are described along with the above-described effects in the section of Detailed Description.

BRIEF DESCRIPTION OF DRAWING

The above and other features and aspects of the present disclosure of invention will be more clearly understood from the following detailed description taken in conjunction with the accompanying drawings, in which:

FIG. 5 is a view showing a beat, a rhythm and a duration corresponding to each rest according to the exemplary embodiment;

DETAILED DESCRIPTION

Figure 1:
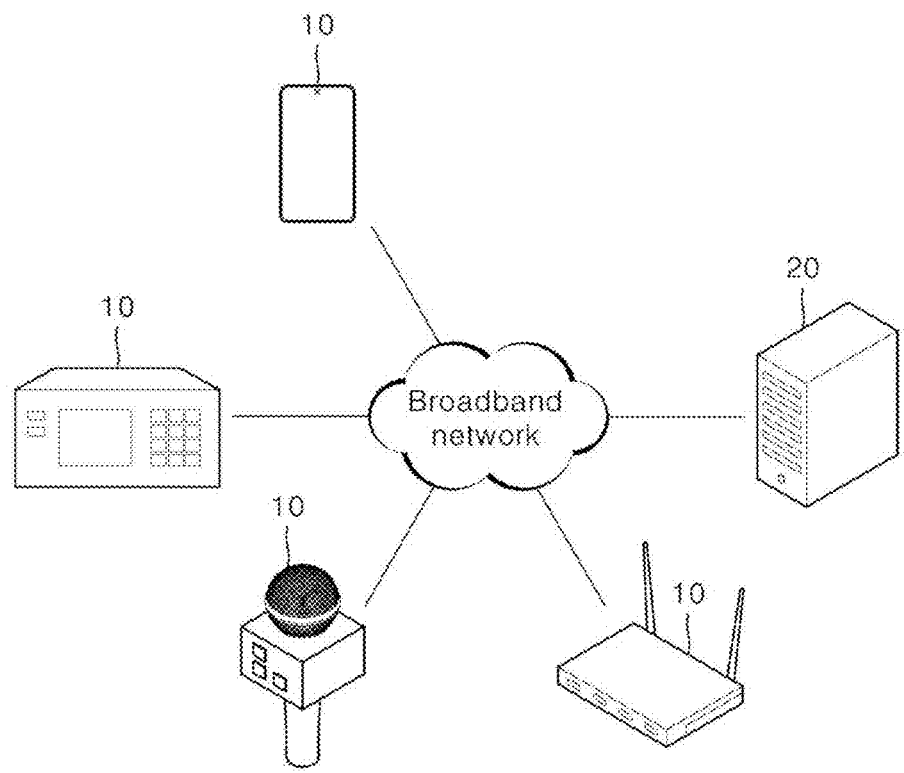
FIG. 1 is a block diagram showing an entire configuration of a song accompaniment system of the related art.

Advantages and features of the present disclosure, and a method for achieving the same can be clearly understood from the following embodiments that are specifically described with reference to the accompanying drawings. However, embodiments of the present disclosure can be implemented in various different forms, and should not be construed as being limited only to the embodiments set forth herein. Rather, the embodiments set forth herein are provided as examples so that the present disclosure can be thorough and complete and can fully convey the subject matter of the disclosure to one having ordinary skill in the art to which the disclosure pertains. The subject matter of the disclosure should be defined only by the scope of the appended claims. Additionally, in some embodiments, detailed description of well-known processes, component structures and technologies are omitted if they are deemed to make the disclosure vague. Throughout the disclosure, like reference numerals denote like components.

In the drawings, thicknesses are exaggerated for clarity in illustrating a plurality of layers and areas. Throughout the disclosure, similar parts are given identical reference numerals. When one part such as a layer, a film, an area, a plate and the like is described as being "on" another part, it can mean that one part is "directly on" another part and that an additional part is interposed between the two parts. When one part is described as being "directly on" another part, it can mean that no additional part is interposed between the two parts. Further, it is to be understood that when one part such as a layer, a film, an area, a plate and the like is described as being "under" another part, it can mean that one part is "directly under" another part and that an additional part is interposed between the two parts. When one part is described as being "directly under" another part, it can mean that no additional part is interposed between the two parts.

Spatial terms such as "below", "beneath", "lower", "above", "upper" and the like can be used herein to readily describe a relative position between one component and other components or among components. The spatial terms should be interpreted as including different directions in which the components are used and operated as well as the direction in the drawings. For example, when components in the drawings are overturned, one component "below" or "beneath" another component can be placed "above" another component. Accordingly, the term "below" or "beneath" can imply not only an upward direction but also a downward direction. The components can be disposed in different directions. Thus, the spatial terms can be interpreted based on the disposition direction.

When one part is described as being "connected", "coupled", or "connected" to another part, one part can be directly connected, coupled or connected to another part. However, it is also to be understood that the two parts can electrically be "connected", "coupled", or "connected" with an additional component therebetween. Throughout the disclosure, unless explicitly described to the contrary, when one part is described as comprising another part, it should imply the inclusion of any other component but not the exclusion of any other component.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all the terms (technical and science words) used herein have the same meaning as commonly understood by one having ordinary skill in the art. Additionally, terms such as those defined in commonly used dictionaries should not be interpreted in an ideal or overly sense, unless explicitly defined herein.

Below, a sound source file structure, a recording medium recording the same, and a method of manufacturing a sound source file according to embodiments are described with reference to the accompanying drawings.

Figure 2:
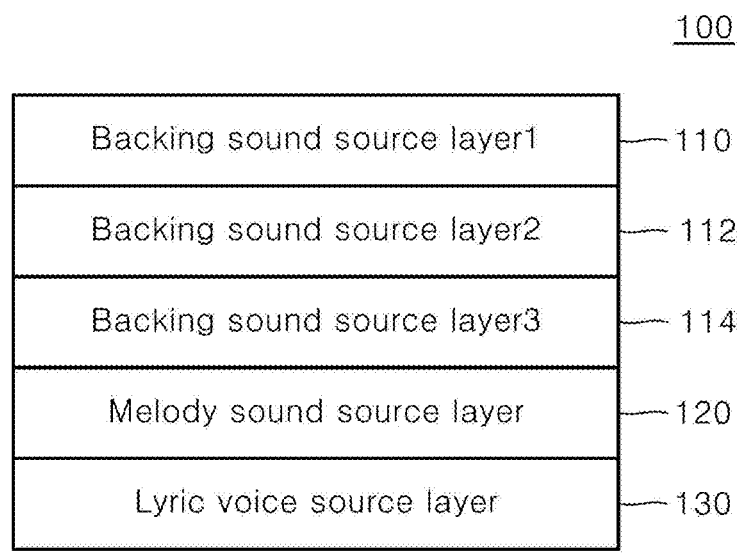
FIG. 2 is a view showing a sound source file structure according to an exemplary embodiment.

FIG. 2 is a view showing a sound source file structure according to an exemplary embodiment.

Referring to FIG. 2, a sound source file structure 100 according to an embodiment may include one or more backing sound source layers 110-114, a melody sound source layer 120, and a lyric voice source layer 130.

The sound source file structure 100 may be recorded on a recording medium such as a compact disc (CD) or a memory and the like.

In the sound source file structure 100 according to an embodiment, different areas are illustrated as different "layers" but not limited. The areas may also be illustrated as channels. That is, the sound source file structure 100 may include one or more backing sound source channels 110-114, a melody sound source channel 120, and a lyric voice source channel 130, for example.

The sound source file structure 100 may only include a melody sound source layer 120, and a lyric voice source layer 130 with no backing sound source layer 110-114.

As illustrated in FIG. 2, in the sound source file structure 100, layers or channels may be perpendicularly structured, but not limited. In the sound source file structure 100, layers or channels may also be horizontally structured.

For example, the sound source file structure 100 according to an embodiment may have a horizontal structure when horizontally recorded on a recording medium, and may have a perpendicular structure when perpendicularly recorded on a recording medium in layers.

In the sound source file structure 100, each layer or channel may denote a different area, and may include a sound source having a different feature, regardless of a perpendicular structure or a horizontal structure of the sound source file structure 100.

As illustrated in FIG. 2, in the sound source file structure 100, a melody sound source layer 120 may be disposed on a lyric voice source layer 130, a backing sound source layer 3 114 may be disposed on the melody sound source layer 120, a backing sound source layer 2 112 may be disposed on the backing sound source layer 3 114, and a backing sound source layer 1 110 may be disposed on the backing sound source layer 2 112, but not limited. The order of disposing the layers may vary.

Figure 3:
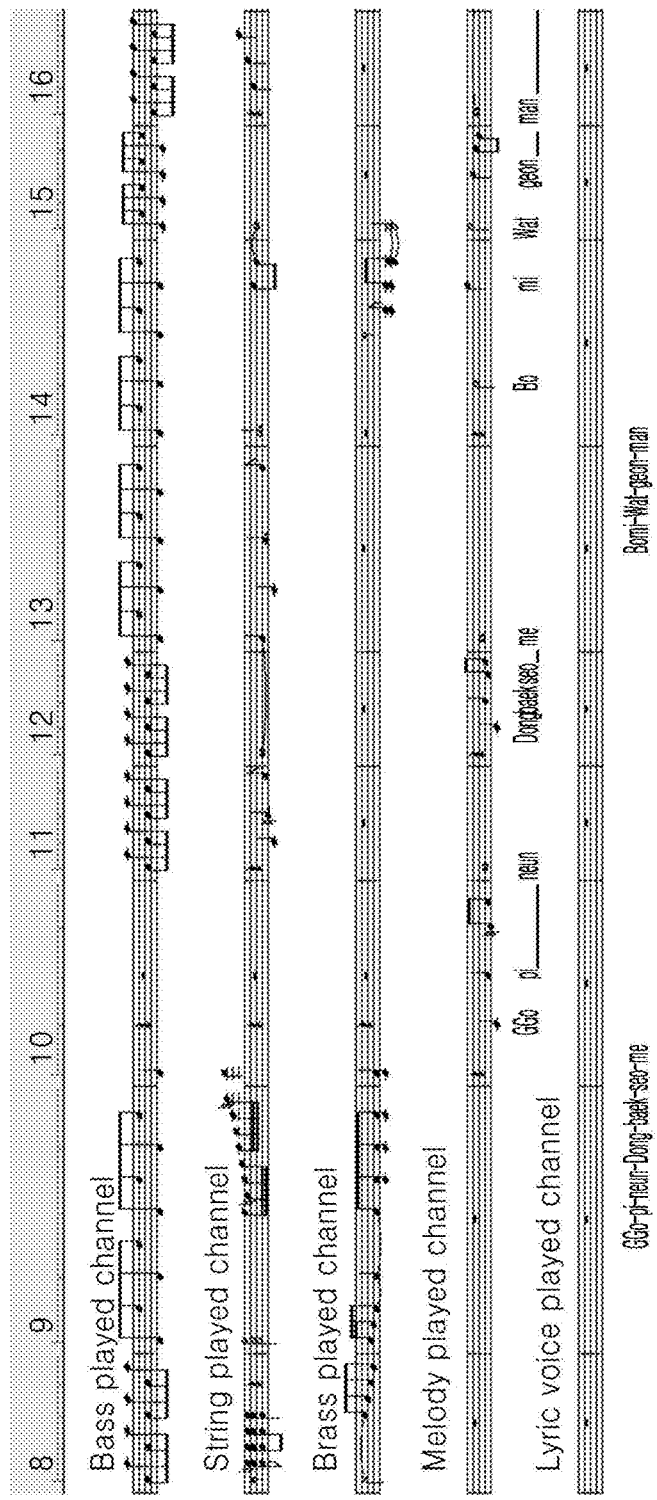
FIGS. 3 and 4 are views showing an example of a constituent of each layer in a sound source file structure according to the exemplary embodiment.
Figure 4:
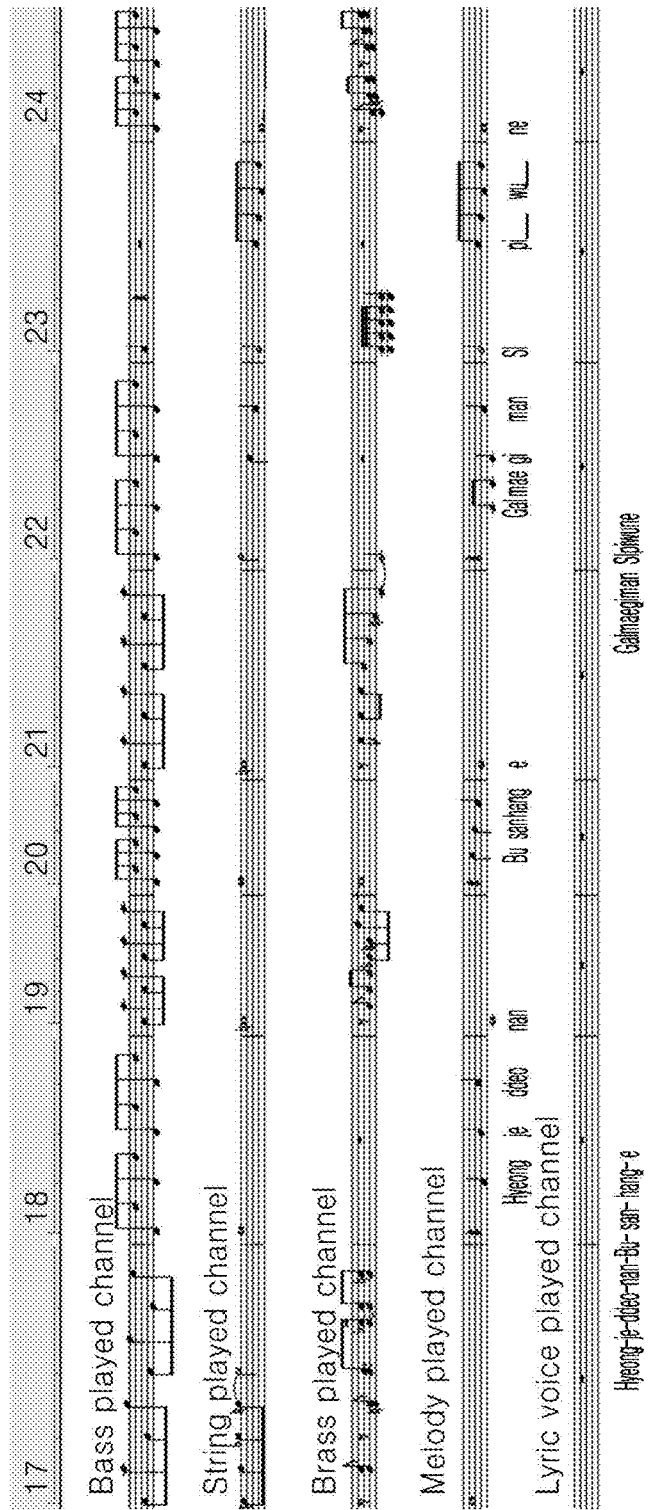

In the backing sound source layer 110-114, backing sounds based on beats and rhythms may be placed. For example, the backing sound source layer 110-114, as illustrated in FIGS. 3 and 4, may include a bass played channel 110 on which bass sounds are placed, a string ensemble playing channel 112 on which string ensemble sounds are placed, and a brass played channel 114 on which brass sounds are placed. FIGS. 3 and 4 are views showing an example of a constituent of each layer in the sound source file structure according to an embodiment.

Additionally, in the backing sound source layer 110-114, accompaniment sounds based on beats and rhythms may be placed. Accordingly, the backing sound source layer 110-114 may also be referred to as "accompaniment sound source layers" or "accompaniment sound source channels".

In the melody sound source layer 120, melody notes corresponding to lyrics based on beats and rhythms, and a rest section corresponding to a rest may be placed.

In the melody sound source layer 120, melody notes corresponding to lyrics may be played. Accordingly, the melody sound source layer 120 may also be referred to as a "melody note played layer 120" or a "melody note played channel 120".

Further, the melody sound source layer 120 may also be referred to as a "singing layer 120" or a "singing channel 120" as a user (performer) sings based on lyrics corresponding to melody notes.

In the lyric voice source layer 130, a lyric voice may be placed at a position corresponding to a rest section. The lyric voice, as illustrated in FIGS. 3 and 4, may be a previous lyric sound for outputting lyrics as a voice in advance prior to a start of a melody, and may distinguish from lyrics for singing, corresponding to a melody.

The rest section, as illustrated in FIG. 5, may include one or more of durations corresponding to a whole rest, a dotted half rest, a half rest, a dotted quarter rest, a quarter rest, a dotted eighth rest, an eighth rest, a sixteenth rest. FIG. 5 is a view showing a beat, a rhythm and a duration corresponding to each rest according to an embodiment.

As illustrated in FIG. 5, when a tempo of a metronome for a quarter note is 60, a duration of the whole rest is 4 seconds, a duration of the dotted half rest is 3 seconds, a duration of the half rest is 2 seconds, and a duration the dotted quarter rest is 1.5 seconds, a duration of the quarter rest is 1 second, and a duration of the dotted eighth rest is 0.75 second, a duration of the eighth rest is 0.5 second, and a duration of the sixteenth rest is 0.25 second, for example.

Additionally, when a tempo of a metronome for a quarter note is 120, a duration of the whole rest is 2 seconds, a duration of the dotted half rest is 1.5 seconds, a duration of the half rest is 1 seconds, and a duration the dotted quarter rest is 0.75 seconds, a duration of the quarter rest is 0.5 second, and a duration of the dotted eighth rest is 0.375 second, a duration of the eighth rest is 0.25 second, and a duration of the sixteenth rest is 0.125 second.

Figure 6:
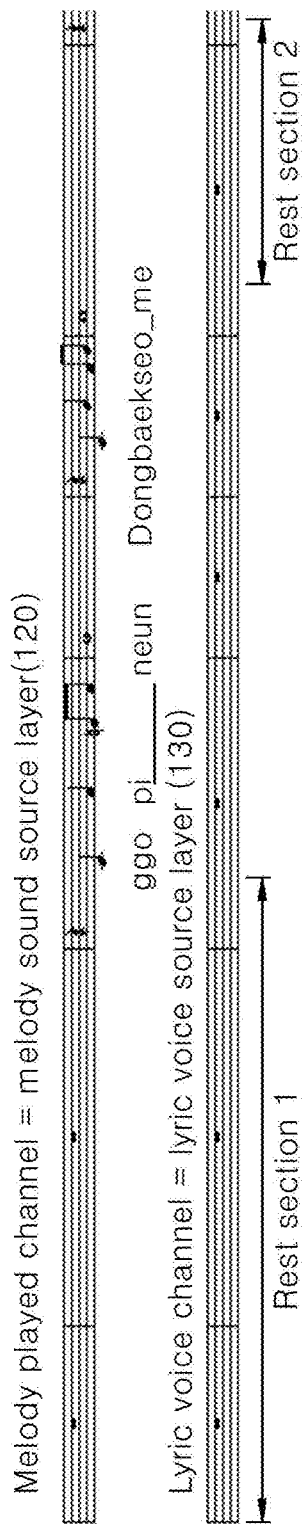
FIG. 6 is a view showing an example of a rest section placed before and after melody notes according to the exemplary embodiment.
Figure 7:
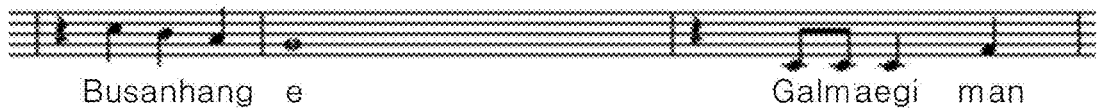
FIG. 7 is a view showing an example of a rest section placed between melody notes according to the exemplary embodiment.
Figure 7:
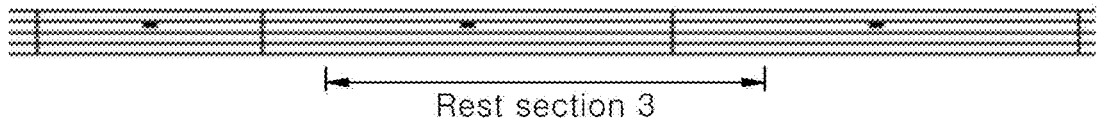

Further, one or more rest sections, as illustrated in FIGS. 6 and 7, may be placed before and after melody notes or between melody notes. FIG. 6 is a view showing an example of a rest section placed before and after melody notes according to an embodiment, and FIG. 7 is a view showing an example of a rest section placed between melody notes according to an embodiment.

In the lyric voice source layer 130, a rest section (rest section 1) may be placed before melody notes in the melody sound source layer 120, or a rest section (rest section 2) may be placed after the melody notes in the melody sound source layer 120, as illustrated in FIG. 6.

Additionally, in the lyric voice source layer 130, a rest section (rest section 3) may be placed between melody notes and melody notes, as illustrated in FIG. 7.

Figure 8:
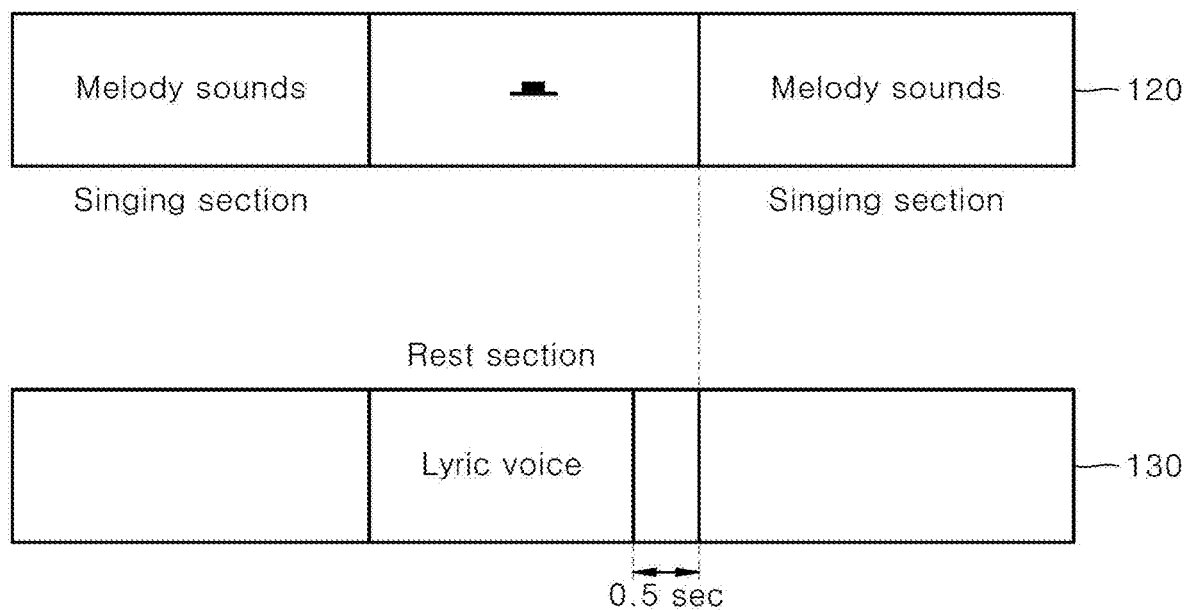
FIG. 8 is a view showing a position of lyrics voice in a lyric voice source layer corresponding to a melody sound source layer according to the exemplary embodiment.

The lyric voice, as illustrated in FIG. 8, may be placed at a position that corresponds to a rest section before melody notes start to play, among positions corresponding to one or more rest sections. FIG. 8 is a view showing a position of lyrics voice in a lyric voice source layer corresponding to a melody sound source layer according to an embodiment. For example, a lyrics voice, as illustrated in FIG. 8, may be placed at a position corresponding to a rest section that is 0.1 to 0.9 second, preferably, 0.5 second before melody notes start to play, among positions corresponding to one or more rest sections.

In this case, the lyric voice may be a voice of a user or a performer, having no beat and rhythm and no pitch interval. Further, the lyric voice may be a voice expressing lyrics having no beat and rhythm.

Figure 9:
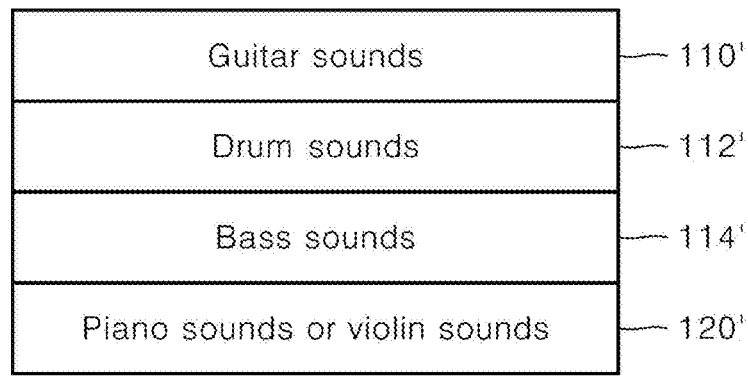
FIG. 9 is a view showing an example of constituents of a backing sound source layer and a melody sound source layer according to the exemplary embodiment.

The backing sound source layer, as illustrated in FIG. 9, may include a first backing sound source layer 110' in which guitar sounds based on beats and rhythms are placed, a second backing sound source layer 112' in which drum sounds based on beats and rhythms are placed, and a third backing sound source layer 114' in which bass sounds based on beats and rhythms are placed. FIG. 9 is a view showing an example of constituents of a backing sound source layer and a melody sound source layer according to an embodiment. As illustrated in FIG. 9, in the melody sound source layer 120', piano sounds corresponding to lyrics based on beats and rhythms may be placed.

Additionally, in the melody sound source layer 120', violin sounds corresponding to lyrics based on beats and rhythms may be placed.

A device for reproducing the above sound source file structure 100 may include a sound source output device such as a song accompaniment device, a karaoke device for business, a home karaoke device, a karaoke microphone, a smartphone, a set-top box or a navigation device and the like.

Figure 10:
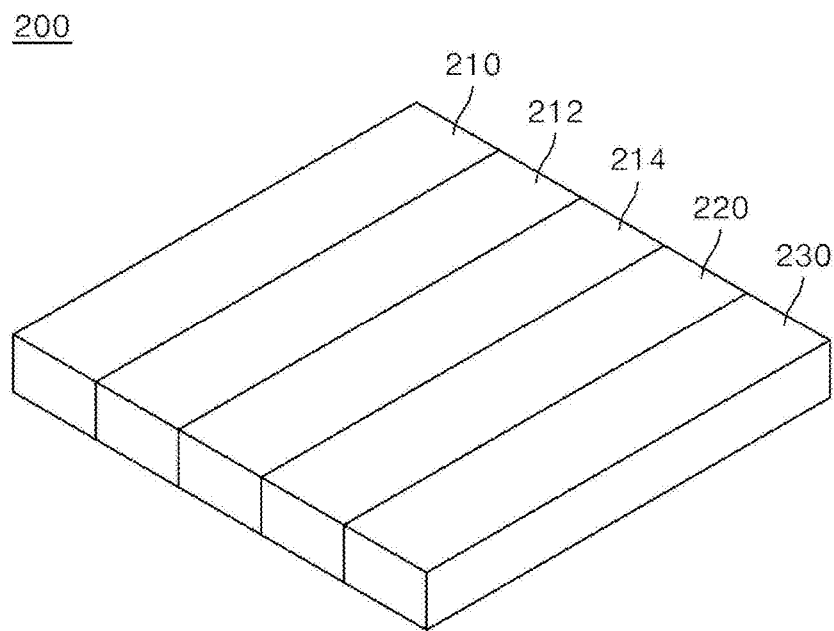
FIG. 10 is a block diagram showing a configuration of a recording medium on which a sound source file structure according to the exemplary embodiment is recorded.

FIG. 10 is a block diagram showing a configuration of a recording medium on which a sound source file structure according to an embodiment is recorded.

Referring to FIG. 10, a recording medium 200, on which the sound source file structure according to an embodiment is recorded, may include one or more backing sound source layers 210-214 in which backing sounds based on beats and rhythms are placed, a melody sound source layer 220 in which melody notes corresponding to lyrics based on beats and rhythms, and a rest section corresponding to a rest are placed; and a lyric voice source layer 230 in which a lyric voice is placed at a position corresponding to a rest section.

In the recording medium 200 on which the sound source file structure according to the exemplary embodiment is recorded, one or more backing sound source layers 210-214, the melody sound source layer 220 and the lyric voice source layer 230 may also be respectively referred to as one or more backing sound source areas 210-214, a melody sound source area 220 and a lyric voice source area 230, based on areas in which the sound source file structure is recorded.

Additionally, in the recording medium 200 on which the sound source file structure according to an embodiment is recorded, one or more backing sound source layers 210-214, the melody sound source layer 220 and the lyric voice source layer 230 may also be respectively referred to as one or more backing sound source channels 210, 212, 214, a melody sound source channel 220 and a lyric voice source channel 230.

Figure 11:
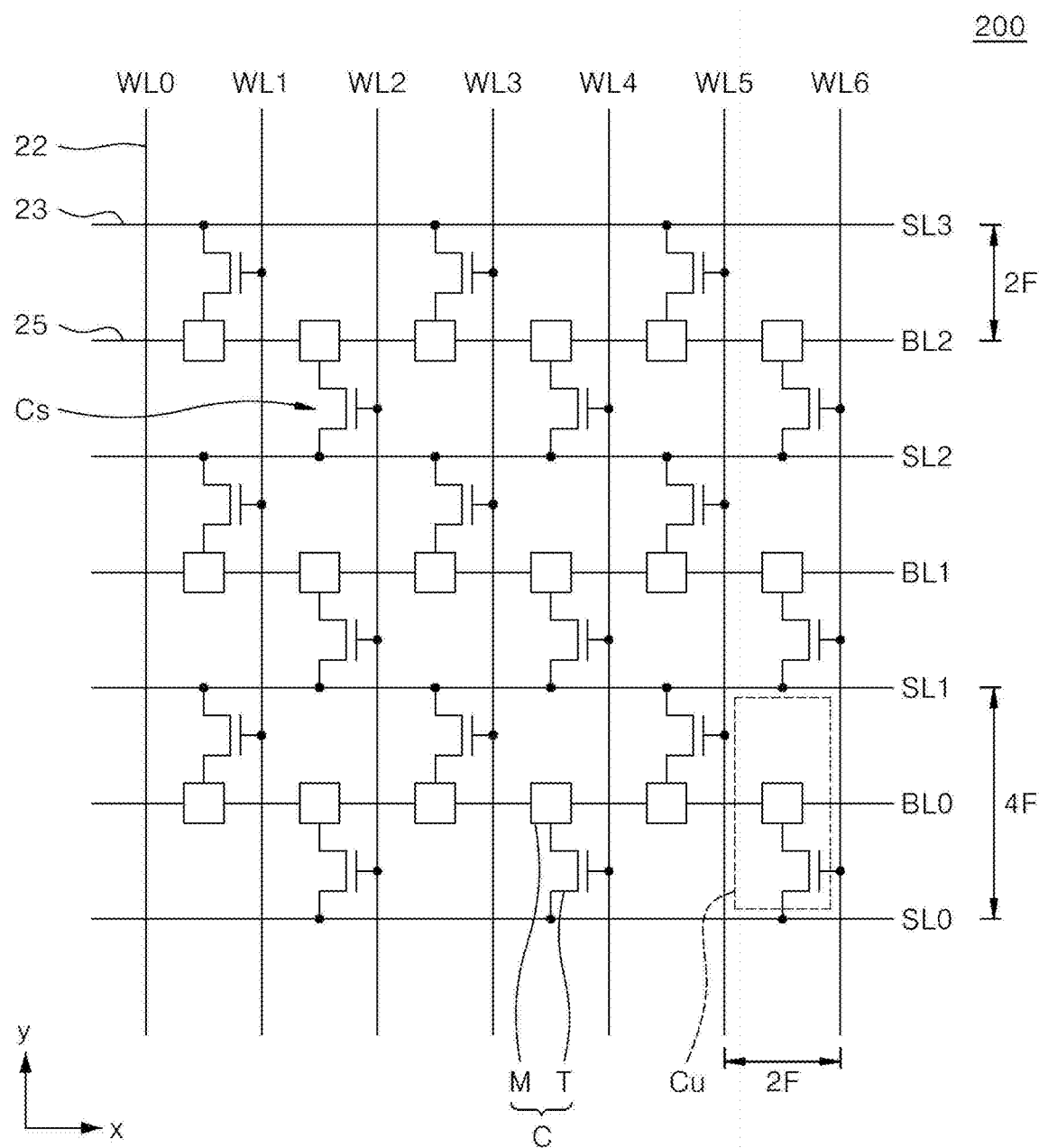
FIG. 11 is a circuit diagram showing a memory cell array of a magnetic memory element as a recording medium according to the exemplary embodiment.

The recording medium 200, on which the sound source file structure according to an embodiment is recorded, may be a magnetic memory element including a magnetic tunnel junction (MTJ) element, and as illustrated in FIG. 11, may be implemented as a memory cell array including a plurality of memory cells C arranged in a matrix form. FIG. 11 is a circuit diagram showing a memory cell array of a magnetic memory element as a recording medium according to an embodiment.

As illustrated in FIG. 11, each of the plurality of memory cells C may include an access transistor T and a memory M. The memory cell array may include a plurality of word lines (WL) 22, a plurality of source lines (SL) 23, and a plurality a bit lines (BL) 25. Each of the plurality of memory cells C may electrically connect to a corresponding word line 22, source line 23 and bit line 25.

As illustrated in FIG. 11, the plurality of word lines 22 may be arranged in parallel with each other in a first direction (an x-direction) and may respectively extend in a second direction (a y-direction), the plurality of source lines 23 may be arranged in parallel with each other in the second direction and may extend in the first direction, and like the plurality of source lines 23, the plurality of bit lines 25 may be arranged in parallel with each other in the second direction and may extend in the first direction. Additionally, the plurality of source lines 23 and the plurality of bit lines 25 may be alternately arranged in the second direction.

In such a memory cell array structure, source lines SL 23 that extend in the same direction as that of a bit line BL 25 alternately share memory cells C with the bit line BL 25 adjacent thereto. In particular, when one word line WL 22 is selected, since there is no memory cell C around a selected memory cell C, it is possible to prevent a memory cell C from being repeatedly selected. That is, in the memory cell array structure according to the present embodiment, there is no memory cell C immediately adjacent to one memory cell C along one word line WL 22 and a memory cell C immediately adjacent to the one memory cell C may be arranged in another word line WL 22 adjacent to the one word line WL 22.

Specifically, a connection relationship between the memory cells C and the word lines WL 22, the source lines SL 23, and the bit lines BL 25 will be described as follows.

The plurality of word lines 22 may connect gates of access transistors T of the plurality of memory cells C, and each of the two adjacent word lines 22 connects to gates of access transistors T arranged at different positions in the second direction.

For example, a second word line WL1 may connect to gates of access transistors T between a first bit line BL0 and a second source line SL1, between a second bit line BL1 and a third source line SL2, and between a third bit line BL2 and a fourth source line SL3, and a third word line WL2 may connect to gates of access transistors T between a first source line SL0 and the first bit line BL0, between the second source line SL1 and the second bit line BL1, and between the third source line SL2 and the third bit line BL2.

The plurality of source lines 23 may connect to sources or drains of the access transistors T of the plurality of memory cells C, and each of the plurality of source lines 23 may connect to sources or drains of access transistors T that alternately connect to different bit lines 25 along the first direction. For example, the second source line SL1 may alternately connect to sources or drains of access transistors T that connect to the first bit line BL0 along the first direction and access transistors T that connect to the second bit line BL1 along the first direction.

The plurality of bit lines 25 may connect to the drains or sources of the access transistors T of the plurality of memory cells C, and each of the plurality of bit lines 25 may connect to drains or sources of access transistors T that alternately connect to different source lines 23 along the first direction. For example, the first bit line BL0 may alternately connect to drains or sources of access transistors T that connect to the first source line SL0 along the first direction and access transistors T that connect to the second source line SL1 along the first direction. Herein, a bit line 25 is deemed to connect to drains or source of corresponding access transistors T through corresponding memories M.

Based on the connection relationship, when any one of the plurality of word lines 22, and any one of the plurality of source lines 23 or the plurality of bit lines 25 are selected, only one memory cell C may be selected. For example, when the third word line WL2, and the third source line SL2 or the third bit line BL2 are selected, the memory cell Cs between the second word line WL1 and the third word line WL2, and between the third source line SL2 and the third bit line BL2 may be selected.

When any one word line and any one bit line are selected in a typical magnetic memory element, a corresponding source line may be automatically selected. Additionally, when any one word line and any one source line are selected, a corresponding bit line may be automatically selected. In FIG. 11, first to seventh word lines WL0-WL6, first to fourth source lines SL0-SL3, and first to third bit lines BL0-BL2 are only illustrated, but they are provided only as an example for convenience of description. For example, when the memory cell array is divided based on a block unit, along a column source line CSL, 8 word lines, 8 source lines and 8 bit lines may be disposed in a single block.

The access transistor T constituting the memory cell C may control supply of current to the memory M while being turned-on or turned-off based on a voltage of the word line 22. For example, the access transistor T may be a MOS transistor or a bipolar transistor. The memory M constituting the memory cell C may include a magnetic material. For example, the memory M may include an MTJ element. The memory M may perform a memory function, based on the spin-transfer torque phenomenon in which a magnetization direction of a magnetic material is changed by input current.

For reference, the magnetic memory device, for example, a magnetic random access memory (MRAM) will be briefly described. In order to store states "0" and "1" in the MTJ devices that are memory devices included in the magnetic memory device, currents that flow through the MTJ devices must be bidirectional. That is, the current that flows through the MTJ devices when data "0" is recorded must be opposite to the current that flows through the MTJ devices when data "1" is recorded.

In order to form a structure in which currents of opposite directions flow, in the magnetic memory device, the source lines other than the bit lines exist. The bit lines and the source lines change respective potential differences with the MTJ devices and the access transistors (or cell transistors) of the memory cell interposed so that the directions of the currents that flow through the MTJ devices of the respective memory cells may be selected.

The magnetic memory device according to the inventive concepts may have a memory cell array structure capable of reducing or minimizing a size of unit memory cells while applying the method of using the separate source lines. That is, as illustrated in FIG. 1, the memory cell array may be designed so that one source line is arranged in one bit line. Therefore, like in the conventional method of using the separate source lines, the voltages of the bit lines and the source lines may be exchanged to be used so that the operating voltage may be reduced.

In addition, since the memory cells are arranged so that two source lines share one bit line, the memory cells may be arranged in zigzags along the word lines WL 22 and the source lines SL 23 or the bit lines BL 25. Therefore, the size of the unit memory cells may be reduced or minimized.

For example, the magnetic memory element according to the present disclosure may have a unit memory cell Cu size indicated by a dashed-line rectangle. Specifically, when a pitch between the word lines 22 is 2 F and a pitch between source lines 23 or the bit lines 25 is 4 F, the unit memory cell Cu size may be 8 F2. Herein, F may denote a minimum lithographic feature size.

Since the memory cells are disposed in a zigzag manner along the word line 22, and the source line 23 or the bit line 25, and as illustrated, connect to the word line 22, the source line 23 and the bit line 25, only one memory cell may be selected by selecting any one word line and any one bit line (or any one source line).

A device for reproducing a recording medium on which the above sound source file structure 100 is recorded may include a sound source output device such as a song accompaniment device, a karaoke for business, a home karaoke device, a karaoke microphone, a smartphone, a set-top box, or a navigation device and the like.

Figure 12:
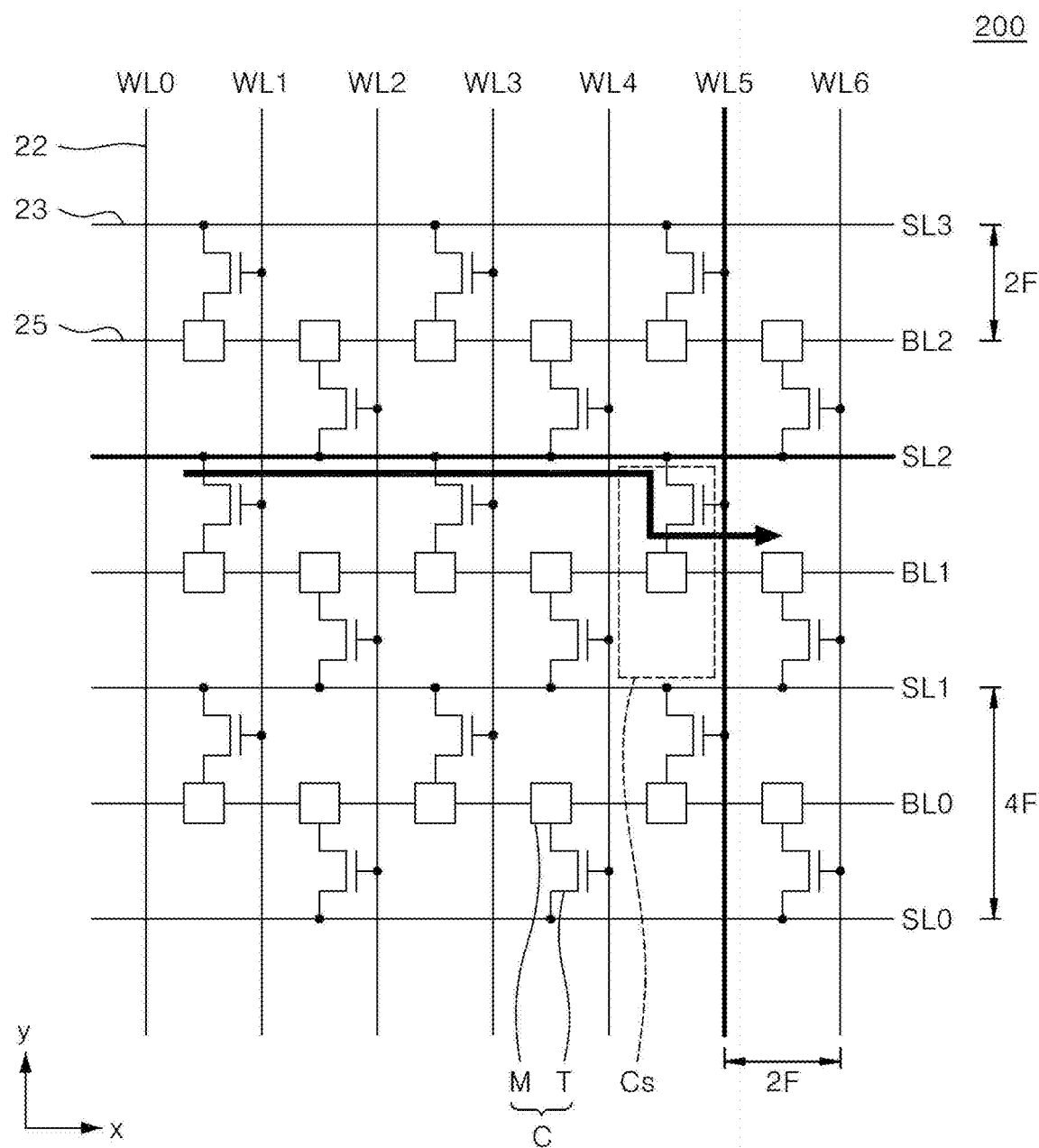
FIG. 12 is a conceptual view for describing a theory of recording data "0" on a recording medium of a magnetic memory element according to the exemplary embodiment.
Figure 13:
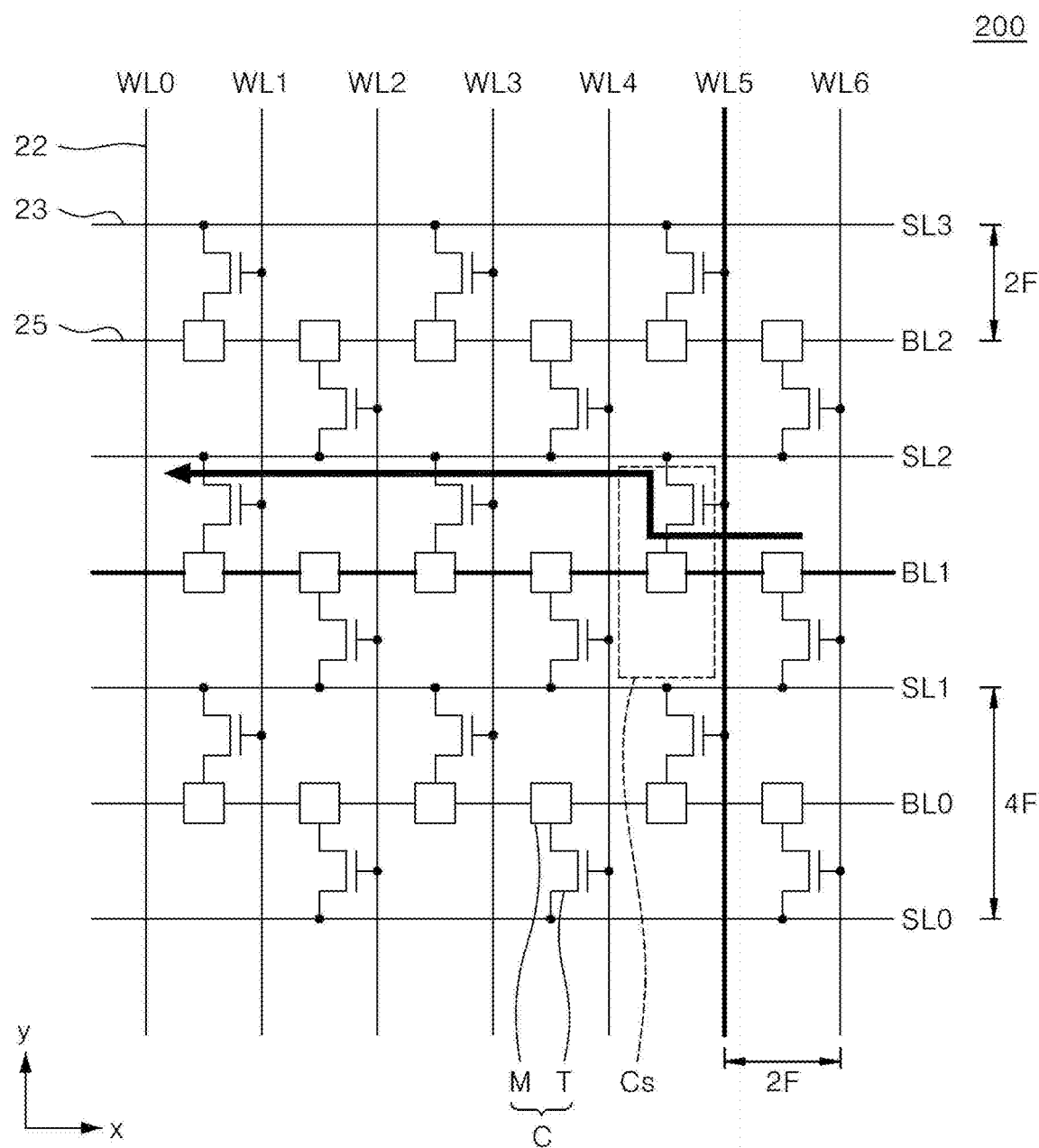
FIG. 13 is a conceptual view for describing a theory of recording data "1" on a recording medium of a magnetic memory element according to the exemplary embodiment.

FIG. 12 is a conceptual view for describing a theory of recording data "0" in a recording medium of a magnetic memory element according to an embodiment, and FIG. 13 is a conceptual view for describing a theory of recording data "1" in a recording medium of a magnetic memory element according to an embodiment.

Backings sounds, melody notes and lyric voices may be respectively converted into 0 or 1. For example, analogue-type backings sounds, melody notes and lyric voices may be respectively converted into 0 or 1 through an analogue-to-digital converter, and may be recorded on a recording medium 200 of the magnetic memory element as follows.

Referring to FIG. 12, when data "0" is to be recorded in a selected memory cell Cs marked with a rectangular dotted line, first, when the sixth word line WL5 and the second bit line BL1 (or the third source line SL2) are selected, the selected memory cell Cs may be uniquely determined.

A high voltage is applied to the third source line SL2, a low voltage is applied to the second bit line BL1, and an appropriate turn-on voltage is applied to the sixth word line WL5 so that a current path marked with an arrow is generated and the data "0" may be recorded in an MTJ device of the selected memory cell Cs. Here, the high voltage applied to the third source line SL2 may be 1.2V and the low voltage applied to the second bit line BL1 may be 0V.

However, the high voltage and the low voltage are example numerical values and the high voltage applied to the source line and the low voltage applied to the bit line are not limited to the above numerical values.

Referring to FIG. 13, when data "1" is to be recorded in the selected memory cell Cs, in the same method, the sixth word line WL5 and the second bit line BL1 (or the third source line SL2) are selected so that the selected memory cell Cs may be determined.

A low voltage is applied to the third source line SL2, a high voltage is applied to the second bit line BL1, and an appropriate turn-on voltage is applied to the sixth word line WL5 so that a current path marked with an arrow is generated and the data "1" may be recorded in the MTJ device of the selected memory cell Cs. Here, the low voltage applied to the third source line SL2 may be 0V and the high voltage applied to the second bit line BL1 may be 1.2V.

That is, the voltages applied when the data "0" is recorded may be exchanged to record the data "1". Therefore, in the memory cell array structure according to the present embodiment, data may be recorded on the MTJ element using the low operation voltage of about 1.2 V. Certainly, as stated in the description of the record of data "0", the high voltage and the low voltage are provided only as an example and may vary.

In FIG. 12 and FIG. 13, the thick line indicates a voltage greater than 0 V is supplied, and the rest thin lines indicate a state where 0V is supplied, i.e., a state where no voltage is supplied. Accordingly, when data "0" is recorded, a predetermined voltage may be supplied to the third source line SL2, and when data "1" is recorded, a predetermined voltage may be supplied to the second bit line BL1.

Figure 14:
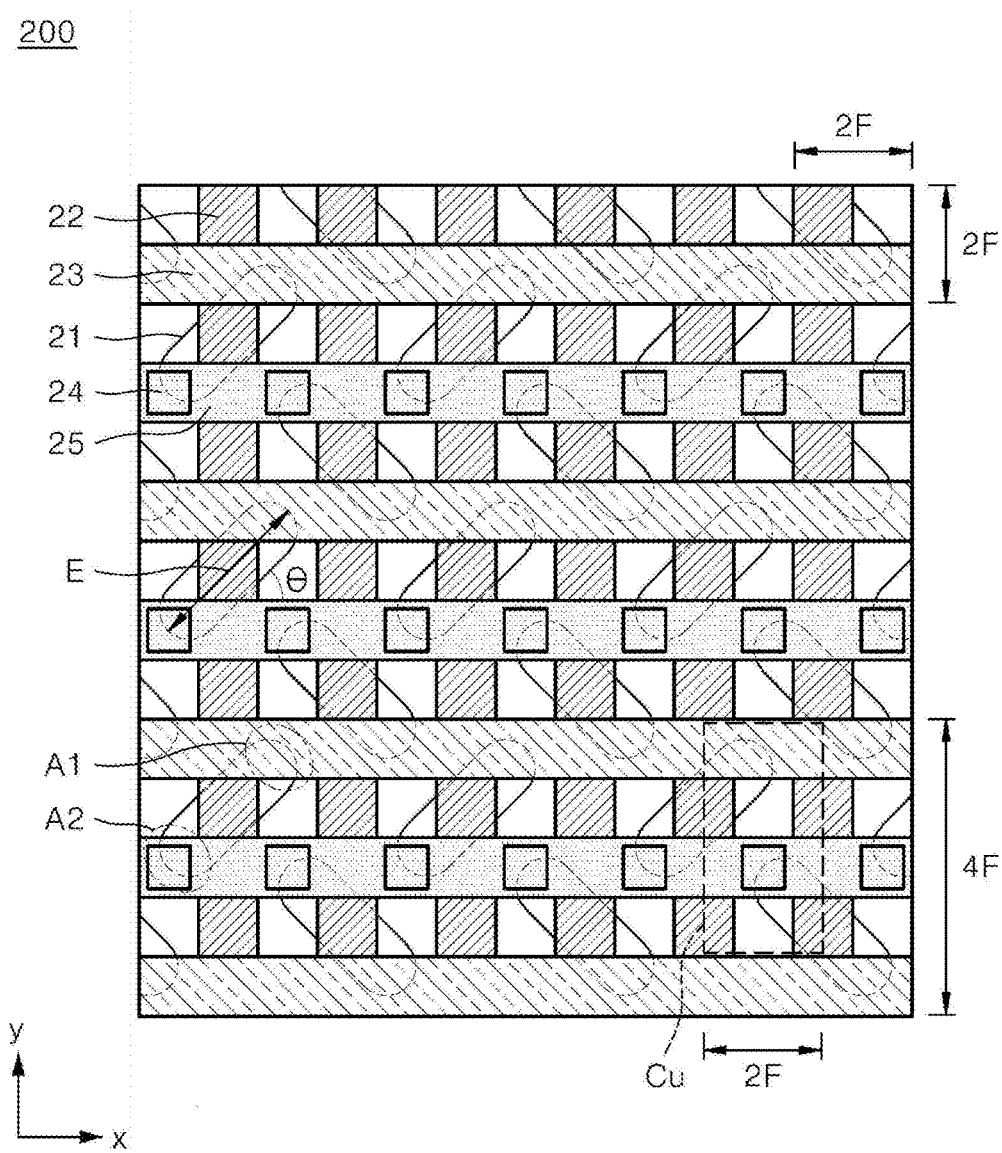
FIG. 14 is a view showing layout of a recording medium of a magnetic memory element according to the exemplary embodiment.

FIG. 14 is a view showing layout of a recording medium of a magnetic memory element according to an embodiment.

Referring to FIG. 14, a magnetic memory element 200 according to an embodiment may include a plurality of memory cells (C in FIG. 11) arranged in a matrix form. Additionally, the magnetic memory element 200 may include a plurality of active areas 21, a plurality of word lines 22, a plurality of source lines 23, a plurality of adjustable resistance structures 24, and a plurality of bit lines 25.

The active region 21 may be defined on a substrate (not illustrated) by an isolation film (not illustrated). For example, the active region 21 may extend in an extension direction E marked with a bidirectional arrow and may be arranged at an oblique angle in a first direction (an x direction). For example, the active regions 21 may be arranged at a first angle θ corresponding to an acute angle in the first direction. In addition, as the active region 21 may be arranged at the oblique angle in the first direction, the active regions 21 may be arranged at the oblique angle in the second direction (a y-direction) vertical to the first direction.

Each of the active regions 21 may include a first region A1 and a second region A2 at both ends thereof. The first region A1 may be an area connecting to the source line 23, and may partially overlap the source line 23. The first region A1 may be a source or drain regions in terms of transistors. The second regions A2 connected to the bit lines 25 may partially overlap the bit lines 25. The second regions A2 may be a drain or source regions in terms of transistors. On the other hand, the second regions A2 of the active regions 21 may be connected to the bit line 25 through the variable resistance structures 24.

A plurality of active areas 21, as illustrated, may be disposed in parallel with each other in the first and second directions. An extension direction E of first line active areas 21 disposed along any one word line 22 in the second direction may cross an extension direction E of second line active areas 21 disposed along an adjacent word line 22. For example, the extension direction E of the first line active areas 21 may be orthogonal to the extension direction E of the second line active areas 21.

Similarly, first group active regions 21 arranged between one bit line 25 and a source line 23 adjacent to the one bit line 25 above the one bit line 25 in the second direction may be arranged so that an extension direction E thereof intersects that of second group active regions 21 arranged between the one bit line 25 and a source line 23 adjacent to the one bit line 25 below the one bit line 25 in the second direction. For example, the first group active regions 21 may be arranged so that the extension direction E thereof intersects that of the second group active regions 21 at right angle.

The active regions 21 may be formed into a semiconductor material layer constituting a substrate or into a semiconductor material layer additionally formed on a substrate. For example, the active area 21 may be formed into a silicon layer formed based on deposition or epitaxial growth on a substrate. The silicon layer, for example, may be a single crystal silicon layer or a poly silicon layer.

The plurality of word lines 22 may be extended in the second direction and disposed in parallel with each other in the first direction on the substrate, and each of the plurality of word lines 22 may be disposed across the plurality of active areas 21 disposed in the second direction and corresponding thereto, on the substrate. For example, each of the plurality of word lines 22 may be disposed across a central portion between the first area A1 and the second area A2 of each of the plurality of active areas 21 disposed in the second direction and corresponding thereto.

The word line 22 may include at least one of a doped semiconductor, metal, a conductive metal nitride, and a metal-semiconductor compound. A pitch between the word lines 22 may be 2 F in the first direction.

The plurality of source lines 23 may be extended in the first direction and disposed in parallel with each other in the second direction. Each of the plurality of source lines 23 may partially overlap and may electrically connect to the first area A1 of each of the plurality of active areas 21. For example, in each of the plurality of source lines 23, the first group active regions 21 arranged between the source line 23 and a bit line 25 adjacent to the source line 23 below the source line 23 in the second direction and the second group active regions 21 arranged between the source line 23 and a bit line 25 adjacent to the source line 23 above the source line 23 in the second direction may be arranged. The first regions A1 of the first group active regions 21 and the second group active regions 21 may be commonly and electrically connected to one source line 23.

Additionally, each of the first group active regions 21 and the second group active regions 21 may be crossed respectively by a different word line 22 in the first direction. Thus, just one active regions 21 among all the active areas included in the first group active regions 21 and the second group active area 21 may be selected as a result of selection of any one word line 22.

The source line 23 may include at least one of metal, a conductive metal nitride, a metal-semiconductor compound and a doped semiconductor. A pitch between the source lines 23 may be 4 F in the second direction.

The plurality of variable resistance structures 24 may be arranged to correspond to the plurality of active regions 21 in the first and second directions. The variable resistance structures 24 may be arranged below the bit lines 25 to be connected to the second regions A2 of the active regions 21 connected to the bit lines 25. That is, the variable resistance structures 24 may be arranged to correspond to the plurality of active regions 21, respectively, and may be electrically connected to the second regions A2 of the plurality of active regions 21, respectively.

Like the source lines 23, the plurality of bit lines 25 may be extended in the first direction and arranged in parallel with each other in the second direction. The plurality of bit lines 25 may be arranged to alternate with the plurality of source lines 23 in the second direction. Each of the plurality of bit lines 25 may partially overlap the second regions A2 of each of the plurality of active regions 21, and may electrically connect to the second regions A2. Each of the plurality of bit lines 25 may electrically connect to the second regions A2 of each of the plurality of active regions 21 through the variable resistance structure 24 arranged between the plurality of bit lines 25.

Each of the plurality of bit lines 150 may have a third group active regions 21 arranged between the bit line 150 and an adjacent source line 23 downward in the second direction, and a fourth group active regions 21 arranged between the bit line 150 and an adjacent source line 23 upward in the second direction. The second regions A2 of each of the third group active regions 21 and the fourth group active regions 21 may connect to a single bit line 25 commonly and electrically through corresponding variable resistance structures 24.

Additionally, each of the third group active regions 21 and the fourth group active regions 21 may be crossed respectively by a different word line 22 in the first direction. Thus, just one active regions 21 among all the active areas included in the third group active regions 21 and the fourth group active regions 21 may be selected as a result of selection of any one word line. The third group active regions 21 may correspond to the second group active regions 21 stated in the above description of the source line 23, and the fourth group active regions 21 may correspond to the first group active regions 21 stated in the above description of the source line 23. An upward direction of the second direction with respect to any one source line 23 may correspond to a downward direction of the second direction with respect to an adjacent bit line 25, and similarly, a downward direction of the second direction with respect to any one source line 23 may correspond to an upward direction of the second direction with respect to an adjacent bit line 25.

The bit line 25 may include at least one of metal, a conductive metal nitride, a metal-semiconductor compound and a doped semiconductor. A pitch between the bit lines 25 may be 4 F in the second direction.

On the other hand, a dotted rectangle may mean a unit memory cell Cu. The unit memory cell Cu may have a size of 8 $F^2$. For reference, when the unit memory cell Cu is defined to include one access transistor (T of FIG. 11) and one variable resistance structure 24 like in FIG. 11, in the layout of the present embodiment, it is very difficult to define the unit memory cell Cu to fully include one active region 21 that forms an access transistor and it may be difficult to calculate the size of the unit memory cell Cu. Therefore, when the unit memory cell Cu is defined as illustrated in FIG. 14, two active regions 21 each of which is about ½ are included in one unit memory cell Cu so that it may be considered that one active region 21 is included. The word lines, the source lines, and the bit lines may be included in the unit memory cell by a similar concepts. For example, two word lines each of which is about ½ may be included in the unit memory cell C.

Figure 15:
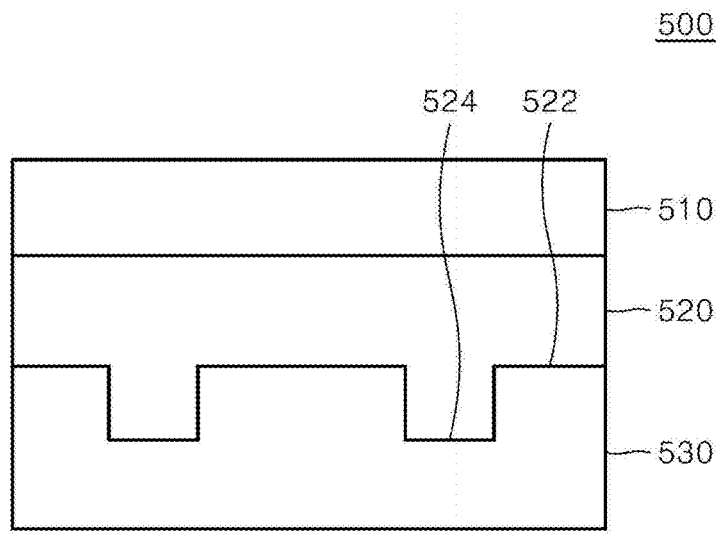
FIG. 15 is a cross-sectional view showing a recording medium according to the exemplary embodiment, implemented as a compact disc (CD)

FIG. 15 is a cross-sectional view showing a recording medium according to an embodiment, implemented as a compact disc (CD).

Referring to FIG. 15, a recording medium 500 of a CD according to an embodiment may include a transparent plastic layer 510, a metallic reflection layer 520, and a protection film 530.

The transparent plastic layer 510 may have a thickness of about 1.2 mm and transmit a laser beam.

The metallic reflection layer 520 may be mainly made of aluminum, and may reflect a laser beam passing through the transparent plastic layer.

The protection film 530 may mainly use polycarbonate. For the protection film 530, polycarbonate may melt into liquid and then a land 522 or a pit 524 representing 0 or 1 may be formed using a stamper. That is, the protection film 530 may include the pit 524 which is burned by a strong laser beam and the color of which turns opaque, and the land 522 which transmits a laser beam and the color of which is transparent, in polycarbonate. Accordingly, when a CD-ROM laser beam radiates to polycarbonate, the portion transparent may be read as the land 522 representing 1, and the portion burned and opaque may be read as the pit 524 representing 0.

As described above, the metallic reflection layer 520 made of aluminum may be coated on the transparent plastic layer 510 and may be coated with the protection layer 530 to create a CD.

In the recording medium 500 having the above structure, backing sounds of the backing sound source layer 110, 112, 114, melody notes of the melody sound source layer 120 and lyric voices of the lyric voice source layer 130 may be respectively recorded as 0 or 1.

To read data stored on the CD, a CD-ROM drive may irradiate a laser beam and measure a length of a path of a laser beam reflected from a surface of the metallic reflection layer 520 and passing through a lens and a Photo Director (a one-way reflection mirror), and a length of waves. In the land 522, almost all of the laser light may reflect without scattering, but in the pit 524, the laser light may diffuse.

The difference may allow light from the pit 524 to eliminate light from the land 522, and a reading mechanism may interpret this as 1. A portion with no change may be accepted as 0. In other words, portions changed from the land 522 to the pit 524 and changed from the pit 524 to the land 522 may be interpreted as 1, and portions that read the land 522 or the pit 524 may be interpreted as 0. Accordingly, when the land 522 or the pit 524 is short, time taken for reading may be short and the number of 0s may be reduced.

The land 522 and the pit 524 may include a minimum of 3 bits (or 90 nm) and a maximum of 11 bits (3300 nm). This is because each bit of data requires a length of about 300 nm on a spiral track.

When the pit 524 and the land 522 are just adjacent to each other, . . . may have continuity of pit-land-pit-land, and the continuity may be expressed as 11111. Accordingly, the continuity may not be sufficiently read using a laser beam. Thus, two pits need to be between three lands all the time, and this means that at least two 0s are between two 1s. However, the continuity of the pit and the land may not be excessively long, and a maximum length needs to be ensured. Thus, two or greater and ten or less 0s may be between two 1s.

However, within 1 byte, a minimum of 3 bits may not be ensured in a combination of 1 and 0, and within a plurality of bytes, a maximum of 11 bits may be exceeded. Thus, data may not be recorded on a CD-ROM in a 8-bit format used for storing data. To solve the problem, the CD-ROM may modulate 8-bit data into 14-bit pattern called a channel bit. This process is referred to as 8-to-14 modulation (Eight-to-Fourteen Modulation; EFM).

A decoder in the CD-ROM may modulate 8-bit data into 14-bit forms using an EFM conversion table. However, even in 14-bit bytes, continuous 1s that occur finally may not be prevented. This is the case where one ends with 1 and another one begins with 1. To prevent this from happening, three merging bits may be placed between bytes. Accordingly, 8-bit bytes usually used for a computer may require 1-channel bits in the CD-ROM.

In the above embodiment, a CD is provided as an example of the recording medium 500, but not limited. The recording medium may also be applied to an LP, a CD-RW, a DVD, a Blu-ray Disc (BD) and the like.

Figure 16:
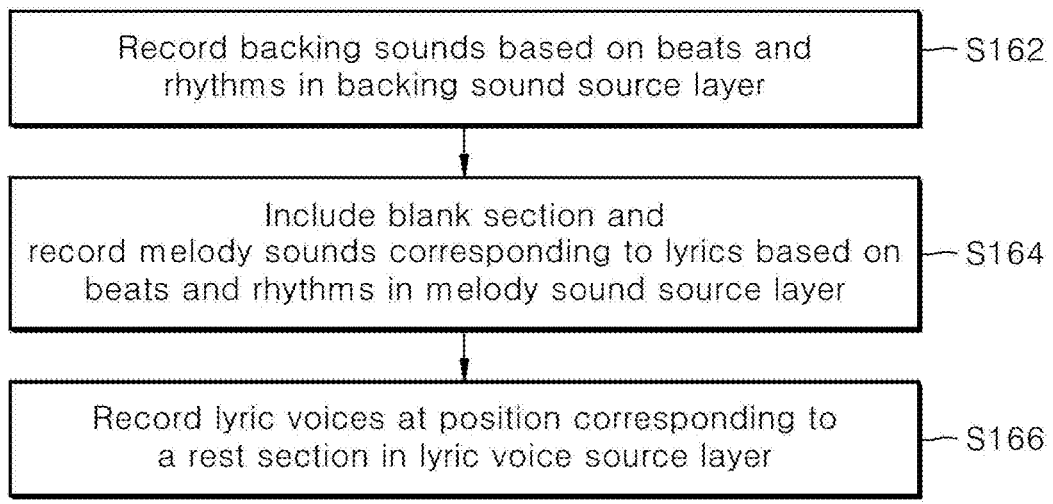
FIG. 16 is an operation flow chart for describing a method of producing a sound source file according to the exemplary embodiment.

FIG. 16 is an operation flow chart for describing a method of producing a sound source file according to an embodiment.

Referring to FIG. 16, in a method of producing a sound source file according to an embodiment, backing sounds based on beats and rhythms may be recorded in the backing sound source layer 110, 112, 114 (S162). The backing sounds may include bass sounds, string ensemble sounds, brass sounds, guitar sounds, and drum sounds, for example.

Additionally, in the melody sound source layer 120, a rest section corresponding to a rest may be included, and melody notes corresponding to lyrics based on beats and rhythms may be recorded (S164). The melody notes may include piano sounds or violin sounds, for example.

Further, in the lyric voice source layer 130, lyric voices may be recorded in a position corresponding to a rest section (S166).

The steps of recording backing sounds (S162), recording melody notes (S164) and recording lyric voices (S166) may be performed at the same time. That is, backing sounds, melody notes and lyric voices may be recorded at the same time in a recording room or a recording studio without noise, instead of being recorded sequentially.

Alternatively, the step of recording backing sounds (S162) may be performed and then the steps of recording melody notes (S164) and recording lyric voices (S166) may be performed at the same time. That is, backing sounds may be recorded, and then melody notes and lyric voices may be recorded while the recorded backing sounds are playing, in a recording room and the like.

Alternatively, the steps of recording backing sounds (S162) and recording melody notes (S164) may be performed at the same time, and then the step of recording lyric voices (S166) may be performed. That is, backing sounds and melody notes may be recorded, and then lyric voices may be recorded while the recorded backing sounds and melody notes are playing, in a recording room and the like.

Alternatively, the step of recording backing sounds S162 may include recording guitar sounds based on beats and rhythms in the first backing sound source layer 110, or recording drum sounds based on beats and rhythms in the second backing sound source layer 112, or recording bass sounds based on beats and rhythms in the third backing sound source layer 114.

The step of recording backing sounds (S162) may include recording bass sounds based on beats and rhythms in the bass played channel 110, or recording string ensemble sounds based on beats and rhythms in the string ensemble playing channel 112, or recording brass sounds based on beats and rhythms in the brass played channel 114.

The step of recording melody notes (S164) may include recording piano sounds corresponding to lyrics based on beats and rhythms in the melody sound source layer, or recording violin sounds corresponding to lyrics based on beats and rhythms in the melody sound source layer.

In the step of recording lyric voices (S166), a lyric voice having no beat and rhythm may be recorded in the lyric voice source layer 130 by a user or a performer through a recording device. The recording device may include a microphone, a mic signal receiver, a DSP, an audio output part, a recording medium and the like, as widely known in the art to which the present disclosure pertains.

In this case, a text corresponding to lyrics instead of a lyric voice may be input by a user or performer through the recording device, and the text may be converted into a lyric voice having a frequency corresponding to a voice of the user or performer, may be output to the recording device and may be recorded in the lyric voice source layer 130. To control this function, the recording device may include a controller. The controller may be provided with a text to speech (TTS) program that converts a text into a voice. The TTS program is also referred to as a TTS engine, and outputs a voice corresponding to each text of lyrics as a voice having a frequency of the voice of the user or performer. The controller may be referred to as a micom, a CPU, a MPU, a microprocessor, a DSP and the like.

The recording medium may include all types of media such as a hard disc and the like that can store data in addition to a CD, a DVD, a Blu-ray Disc described above.

According to the present disclosure, a sound source file structure, a recording medium recording the same, and a method of producing a sound source file may be implemented as described above, such that a sound source output device outputting lyrics together with melodies outputs lyrics as audible sounds right before melodies corresponding to the lyrics start, helps a user to remind the lyrics based on accompaniment for a song after the accompaniment starts to be provided and helps the user to sing based on correct lyrics corresponding to the melodies.

The embodiments are described above with reference to a number of illustrative embodiments thereof. However, it can be understood that numerous other modifications and embodiments can be devised by one skilled in the art within the technical spirit of the disclosure. The numerous other modifications and embodiments can be included in the scope of the present disclosure as long as they do not depart from the technical spirit. Thus, the scope of the right to the present disclosure can be determined according to the appended claims.

What is claimed is:

1. A recording medium, comprising:
   one or more backing sound source layers in which backing sounds based on beats and rhythms are recorded;
   a melody sound source layer in which a rest section corresponding to a rest is included, and melody notes corresponding to lyrics based on the beats and rhythms are recorded; and
   a lyric voice source layer in which lyric voices are recorded in a position corresponding to the rest section,
   wherein
   a text corresponding to lyrics is inputted and converted into the lyric voices having a frequency corresponding to a voice of the user or performer, output to the recording device and is recorded in the lyric voice source layer by the recording device, and
   the backing sounds, the melody notes and the lyric voices are recorded at the same time, and wherein the lyric voice is recorded at a position corresponding to a rest section that is 0.5 second before the melody notes start to play, among positions corresponding to one or more of the rest sections.

2. The recording medium of claim 1, further comprising:
a plurality of active regions defined on a substrate by an isolation film, the plurality of active regions are extended in one direction so that a first region and a second region are provided at both ends of each of the plurality of active regions, arranged so that the one direction forms an oblique angle with respect to a first direction, and arranged in parallel in a second direction intersecting the first direction;
a plurality of word lines arranged in parallel in the first direction while extending in the second direction on the substrate across corresponding ones of the plurality of active regions arranged in the second direction;
a plurality of source lines arranged in parallel in the second direction while extending in the first direction and commonly and electrically connected to the first regions of corresponding ones of the plurality of active regions arranged in the first direction;
a plurality of variable resistance structures arranged in the first direction and the second direction to correspond to the plurality of active regions, and electrically connected to the second regions of corresponding ones of the plurality of active regions; and
a plurality of bit lines arranged in parallel in the second direction while extending in the first direction to alternate with the plurality of source lines and commonly and electrically connected to corresponding ones of the plurality of variable resistance structures arranged in the first direction,
wherein
the backing sounds, the melody notes and the voices are respectively converted into 0 or 1,
a specific memory cell Cs is determined as a result of selection of a specific word line WL5 and a specific bit line BL1, a current path to the specific source line SL2 and an access transistor T of the specific memory cell Cs and the specific bit line BL1 is created as a result of supply of a high voltage to a specific source line SL2, a low voltage to the specific bit line BL1 and a turn-on voltage to the specific word line WL5, and thus, data "0" is recorded on a magnetic transfer junction (MTJ) element of the specific memory cell Cs, and
the specific memory cell Cs is selected as a result of selection of the specific word line WL5 and the specific bit line BL1, a current path to the specific bit line BL1 and an access transistor T of the specific memory cell Cs and the specific source line SL2 is created as a result of supply of a low voltage to the specific source line SL2, a high voltage to the specific bit line BL1 and a turn-on voltage to the specific word line WL5, and thus, data "1" is recorded on an MTJ element of the specific memory cell Cs.

3. The recording medium of claim 1, wherein one or more of the rest sections are recorded before and after the melody notes or between the melody notes.

4. The recording medium of claim 1, the backing sound source layer, comprising:
a first backing sound source layer in which bass sounds based on the beats and rhythms are placed;
a second backing sound source layer in which string ensemble sounds based on the beats and rhythms are placed; and
a third backing sound source layer in which brass sounds based on the beats and rhythms are placed.

5. The recording medium of claim 1, the backing sound source layer, comprising;
a first backing sound source layer in which guitar sounds based on the beats and rhythms are placed;
a second backing sound source layer in which drum sounds based on the beats and rhythms are placed; and
a third backing sound source layer in which bass sounds based on the beats and rhythms are placed.

6. The recording medium of claim 1, wherein in the melody sound source layer, piano sounds or violin sounds corresponding to lyrics based on the beats and rhythms are recorded.

7. A method of producing a sound source file, comprising:
(a) recording backing sounds based on beats and rhythms in a backing sound source layer;
(b) recording melody notes corresponding to lyrics based on the beats and rhythms in a melody sound source layer including a rest section corresponding to a rest; and
(c) recording lyric voices in a position corresponding to the rest section in a lyric voice source layer,
wherein
a text corresponding to lyrics is inputted and converted into the lyric voices having a frequency corresponding to a voice of the user or performer, output to the recording device and is recorded in the lyric voice source layer by the recording device, and
the backing sounds and melody notes are recorded at the same time, and then the lyric voices are recorded while the recorded backing sounds and melody notes are played, and
wherein the lyric voice is recorded at a position corresponding to a rest section that is 0.5 second before the melody notes start to play, among positions corresponding to one or more of the rest sections.

8. The method of claim 7, wherein the rest section has durations corresponding to a whole rest, a dotted half rest, a half rest, a dotted quarter rest, a quarter rest, a dotted eighth rest, an eighth rest, and a sixteenth rest.

9. The method of claim 7, wherein one or more of the rest sections are placed before and after the melody notes or between the melody notes.

10. The method of claim 7, wherein (a) comprises
recording bass sounds based on the beats and rhythms in a first backing sound source layer, or
recording string ensemble sounds based on the beats and rhythms in a second backing sound source layer, or
recording brass sounds based on the beats and rhythms in a third backing sound source layer.

11. The method of claim 7, wherein (a) comprises
recording guitar sounds based on the beats and rhythms in a first backing sound source layer, or
recording drum sounds based on the beats and rhythms in a second backing sound source layer, or
recording bass sounds based on the beats and rhythms in a third backing sound source layer.

12. The method of claim 7, wherein (b) comprises recording piano sounds or violin sounds corresponding to lyrics based on the beats and rhythms in the melody sound source layer.

* * * * *